US011375585B2

(12) United States Patent
Galindo Perez et al.

(10) Patent No.: US 11,375,585 B2
(45) Date of Patent: Jun. 28, 2022

(54) COOKING APPLIANCE APPARATUS, AND METHOD FOR OPERATING A COOKING APPLIANCE APPARATUS

(71) Applicant: BSH Hausgeräte GmbH, Munich (DE)

(72) Inventors: Juan Jose Galindo Perez, Saragossa (ES); Sergio Llorente Gil, Saragossa (ES); Carlos Obon Abadia, Saragossa (ES); Jose Manuel Palacios Gasos, Saragossa (ES); Enrique Javier Perez Visa, Saragossa (ES); Edgar Jorge Ramirez Laboreo, Saragossa (ES); Fernando Sanz Serrano, Calamocha (ES); Rebeca Soria Ruiz, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 425 days.

(21) Appl. No.: 16/466,310

(22) PCT Filed: Dec. 12, 2017

(86) PCT No.: PCT/IB2017/057828
§ 371 (c)(1),
(2) Date: Jun. 4, 2019

(87) PCT Pub. No.: WO2018/116063
PCT Pub. Date: Jun. 28, 2018

(65) Prior Publication Data

US 2020/0068661 A1 Feb. 27, 2020

(30) Foreign Application Priority Data

Dec. 23, 2016 (ES) .................................. 201631667

(51) Int. Cl.
*A21B 1/40* (2006.01)
*A21B 1/02* (2006.01)
(Continued)

(52) U.S. Cl.
CPC ............ *H05B 1/0263* (2013.01); *F24C 7/06* (2013.01); *F24C 7/085* (2013.01); *H05B 6/06* (2013.01); *H05B 2213/07* (2013.01)

(58) Field of Classification Search
CPC .... A21B 1/02–10; A21B 1/40; H05B 1/0263; H05B 6/129
See application file for complete search history.

(56) References Cited

U.S. PATENT DOCUMENTS

2013/0213951 A1 8/2013 Boedicker et al.
2015/0300651 A1* 10/2015 Johncock ............ H05B 1/0263 219/457.1
2016/0025350 A1 1/2016 Goble et al.

FOREIGN PATENT DOCUMENTS

WO 2012131563 A1 10/2012

OTHER PUBLICATIONS

International Search Report PCT/IB2017/057828 dated Mar. 12, 2018.

* cited by examiner

*Primary Examiner* — Michael A Laflame, Jr.
(74) *Attorney, Agent, or Firm* — Michael E. Tschupp; Andre Pallapies; Brandon G. Braun

(57) ABSTRACT

A cooking appliance apparatus, in particular an oven apparatus, includes a first heating element, a second heating element, a control unit configured to jointly operate the first and second heating elements to heat a cooking chamber in an operating state, and a power distributor unit which is configured to divide a total power into a first output power and a second output power in the operating state and to supply the first output power to the first heating element and the second output power to the second heating element.

23 Claims, 2 Drawing Sheets

(51) Int. Cl.

| | |
|---|---|
| ***H05B 1/02*** | (2006.01) |
| ***F24C 7/06*** | (2006.01) |
| ***F24C 7/08*** | (2006.01) |
| ***H05B 6/06*** | (2006.01) |

COOKING APPLIANCE APPARATUS, AND METHOD FOR OPERATING A COOKING APPLIANCE APPARATUS

CROSS-REFERENCES TO RELATED APPLICATIONS

This application is the U.S. National Stage of International Application No. PCT/IB2017/057828, filed Dec. 12, 2017, which designated the United States and has been published as International Publication No. WO 2018/116063 A1 and which claims the priority of Spanish Patent Application, Serial No. P201631667, filed Dec. 23, 2016, pursuant to 35 U.S.C. 119(a)-(d).

BACKGROUND OF THE INVENTION

The invention is based on a cooking appliance apparatus and a method for operating a cooking appliance apparatus.

Cooking appliances, such as ovens and/or microwaves for example, with at least two heating elements, which can be operated jointly in at least one operating state, are known from the prior art. The heating elements here are generally operated at their respective rated power and are connected for example to different phases of a power network. The heating elements are operated in a pulsed manner to reduce the heating power of the heating elements.

BRIEF SUMMARY OF THE INVENTION

It is the object of the invention in particular to provide a generic cooking appliance apparatus with improved properties in respect of flexibility.

The invention is based on a cooking appliance apparatus, in particular an oven apparatus and advantageously an induction oven apparatus, with at least one first heating element, with at least one second heating element, which is configured in particular separately from the first heating element, and with a control unit, which is provided to operate the first heating element and the second heating element jointly and in particular simultaneously to heat a cooking chamber in at least one operating state.

It is proposed that the cooking appliance apparatus has at least one power distributor unit, which is provided to divide a total power, supplied in particular by an energy source, for example a power network and/or a household network, in the operating state, into at least one, advantageously constant, first output power and at least one, advantageously constant, second output power and to supply, in particular to feed, the first output power to the first heating element and the second output power to the second heating element. "Provided" means in particular specifically programmed, designed and/or equipped. That an object is provided for a specific function means in particular that the object satisfies and/or performs said specific function in at least one application and/or operating state.

A "cooking appliance apparatus" in this context refers in particular to at least a part, in particular a module, of a cooking appliance, in particular a grill appliance, a microwave and/or preferably an oven. The cooking appliance here is advantageously configured as an induction cooking appliance, in particular an induction grill appliance, an induction microwave and/or particularly preferably an induction oven. The cooking appliance apparatus also comprises in particular at least one appliance housing, which in particular delimits and/or defines the cooking chamber, and at least one appliance closing element, which is provided to cover, in particular close off, the cooking chamber. The heating elements are also advantageously arranged at a distance from one another and are provided in particular to heat the cooking chamber, in particular individually and/or jointly.

Also a "power distributor unit" refers in particular to a unit, arranged in particular between the energy source and the heating elements, which is provided in particular to distribute the total power, advantageously in a variable manner, to the heating elements, and in the process in particular to supply, in particular feed, an output power to at least one of the heating elements. To this end the power distributor unit is advantageously connected directly to the energy source, in particular the power network and/or household network and advantageously at least one phase of the power network and/or household network. A "total power" refers in particular to a maximum available power, which is advantageously around 3600 W per phase. An "output power" of the power distributor unit refers in particular to a power which is supplied to at least one output of the power distributor unit in at least one operating state. In particular the output power here is fed to at least one of the heating elements. The output power is preferably different from a pulsed power. A "control unit" refers in particular to an electrical and/or electronic unit, which is preferably integrated in the appliance housing and is provided in particular to control and/or regulate operation of the cooking appliance apparatus, at least by activating the power distributor unit. To this end the control unit preferably comprises a computation unit and in particular, in addition to the computation unit, a storage unit with a control and/or regulation program stored therein, which is provided in particular to be executed by the computation unit. The expression that "the control unit is provided to operate a heating element" means in particular that the control unit is provided to activate the power distributor unit and to feed a heating power, in particular the output power, and/or electrical energy to the heating element by means of the power distributor unit. This embodiment provides a cooking appliance apparatus with improved properties in respect of flexibility. In particular it is possible to heat the cooking chamber in an advantageously flexible manner and/or a manner tailored individually to a user's needs, with at least essentially regular, gentle and/or individual heating of items to be cooked. A high level of operator convenience in particular can also be achieved. Efficiency, in particular power efficiency, energy efficiency, space efficiency, component efficiency and/or cost efficiency can also advantageously be improved. A plurality of different operating modes can also be provided, allowing for example advantageously fast preheating, advantageously fast cooking and/or advantageously fast cleaning.

The cooking appliance apparatus particularly preferably comprises at least one third heating element, which is in particular configured separately from the first heating element and the second heating element, the control unit being provided to operate the first heating element, the second heating element and the third heating element jointly and in particular simultaneously to heat the cooking chamber in at least one additional operating state and the power distributor unit being provided to divide the total power into at least one, in particular constant, first output power, at least one, in particular constant, second output power and at least one, in particular constant, third output power in the additional operating state and to supply, in particular feed, the first output power to the first heating element, the second output power to the second heating element and the third output power to the third heating element. In particular the cooking appliance apparatus can also comprise at least three, at least four and/or at least five heating elements, which are operated jointly and in particular simultaneously by the control unit, in particular by activating the power distributor unit, to heat the cooking chamber. This can further increase flexibility in particular.

A total output power of the power distributor unit is preferably at least essentially equal to the total power, advantageously in any operating state, thereby providing a particularly energy-efficient cooking appliance apparatus. It also advantageously prevents any possible occurrence of flicker. A "total output power" refers in particular to the sum of the output powers, in particular all the output powers, of the power distributor unit at a specific time point. The power distributor unit is advantageously provided to supply, in particular feed, each of the output powers to at least one and advantageously just one heating element. That the total output power of the power distributor unit is "at least essentially equal" to the total power in this context means in particular that the total output power deviates by maximum 5%, preferably maximum 3% and particularly preferably by maximum 1%, from the total power. In particular the total output power of the power distributor unit in this instance corresponds at least essentially to a power consumption of the power distributor unit.

If the total power is at least 3600 W, the cooking appliance apparatus can be operated in a particularly fast and/or flexible manner. In particular the power distributor unit can be connected to just one phase of a power network and/or a household network, so the total power is maximum 3600 W and/or an electric current is maximum 16 A. Alternatively a power distributor unit could however also be connected to at least two phases and/or three phases of a power network and/or a household network in this instance.

It is further proposed that the first output power is lower than a maximum rated power of the first heating element and/or the second output power is lower than a maximum rated power of the second heating element, in particular in the operating state at least. In the additional operating state the first output power is advantageously lower than a maximum rated power of the first heating element, the second output power is advantageously lower than a maximum rated power of the second heating element and/or the third output power is advantageously lower than a maximum rated power of the third heating element. A "rated power" of a heating element refers in particular to an advantageously maximum power, in particular heating power, of the heating element, as preset and/or standardized by a manufacturer in particular, for which the structure of the heating element is designed. This allows particularly flexible and also efficient heating to be achieved in particular.

In one particularly preferred embodiment of the invention it is proposed that the power distributor unit is provided to set a value of the first output power and/or the second output power in a variable manner, in particular at least in the operating state and in particular in a power interval between 0% of the total power and 100% of the total power. The power distributor unit is advantageously provided to set a value of the first output power, the second output power and/or the third output power in a variable manner, in particular in a power interval between 0% of the total power and 100% of the total power, in the additional operating state. The power distributor unit is preferably provided to supply at least four, advantageously at least six, preferably at least eight and particularly preferably at least ten, different values and/or output powers, each of which is preferably lower than a maximum rated power of a respective heating element, to each of the heating elements. This in particular allows particularly flexible heating of the cooking chamber.

A particularly compact, flexible and/or cost-efficient power distributor unit can be achieved in particular if the power distributor unit is configured as an, in particular spatially delimited, structural unit and is advantageously arranged on just one support element, particularly advantageously just one circuit board, and/or has just one housing enclosing in particular functional components of the power distributor unit.

The heating elements, in particular the first heating element and the second heating element or the first heating element, the second heating element and the third heating element, could be configured as heating elements of the same type, for example as microwave elements, induction heating elements or resistance heating elements. In one particularly preferred embodiment of the invention however it is proposed that the heating elements, in particular at least the first heating element and the second heating element, are of a different type. In particular the heating elements, in particular at least the first heating element and the second heating element, are configured different in this instance. This allows advantageously flexible power distribution, in particular even when different heating elements are used.

In one preferred embodiment of the invention it is proposed that at least one of the heating elements is configured as an induction heating element. In particular the heating element configured as an induction heating element is provided to generate an electromagnetic alternating field, in particular with a frequency between 17 kHz and 150 kHz and advantageously between 20 kHz and 100 kHz and in particular to generate heat, in particular by eddy current induction and/or remagnetization effects, in at least one, in particular at least partially metallic, preferably ferromagnetic, object to be heated, in particular by means of the electromagnetic alternating field. The object to be heated could be for example cookware present in and/or introduced into the cooking chamber and/or at least one muffle wall of the appliance housing, which in particular delimits the cooking chamber. This in particular allows advantageously efficient heating of the cooking chamber.

It is further proposed that at least one of the heating elements is configured as a resistance heating element. The heating element configured as a resistance heating element here in particular has at least one electrical resistance, through which electric current flows in at least one application state, and is provided in particular to use the electrical resistance to convert energy to heat and to feed it in particular to at least one object to be heated. The object to be heated could be for example cookware present in and/or introduced into the cooking chamber and/or at least one muffle wall of the appliance housing, which in particular delimits the cooking chamber. In the present instance the heating element is particularly preferably configured as a ring heating element, arranged in particular in a region of a fan unit, advantageously a fan wheel, of the cooking appliance apparatus. This allows a lower cost heating element to be used than in the case of an induction heating element, thereby keeping costs low. It also allows flexible heating of the cooking chamber.

According to one particularly preferred embodiment of the invention it is proposed that in at least one further operating state the power distributor unit is provided to convert the total power to, in particular just, one output power and supply, in particular feed, it to, in particular just, one of the heating elements. In particular the control unit is provided to operate just one of the heating elements, in particular any one of the heating elements, preferably the first heating element, the second heating element or the third heating element, to heat the cooking chamber in the further operating state. In this instance the output power is preferably equal to a maximum rated power of a heating element operated in the further operating state. This in particular further increases flexibility and/or user friendliness.

The invention is also based on a method for operating a cooking appliance apparatus, which has at least one first heating element and at least one second heating element, which is configured in particular separately from the first heating element, these being operated jointly and in particular simultaneously to heat a cooking chamber in at least one operating state.

It is proposed that in the operating state a total power, which is supplied in particular by an energy source, for example a power network and/or a household network, is divided by means of at least one power distributor unit into at least one, advantageously constant, first output power and at least one, advantageously constant, second output power and the first output power is supplied, in particular fed, to the first heating element and the second output power is supplied, in particular fed, to the second heating element. This improves flexibility in particular. In particular it is possible to heat the cooking chamber in an advantageously flexible manner and/or a manner tailored individually to a user's needs, with at least essentially regular, gentle and/or individual heating of items to be cooked. A high level of operator convenience in particular can also be achieved. Efficiency, in particular power efficiency, energy efficiency, space efficiency, component efficiency and/or cost efficiency can also advantageously be improved. A plurality of different operating modes can also be provided, allowing for example advantageously fast preheating, advantageously fast cooking and/or advantageously fast cleaning.

The cooking appliance apparatus and the method for operating the cooking appliance apparatus are not limited here to the application and embodiment described above. In particular the cooking appliance apparatus and the method for operating the cooking appliance can have a number of individual elements, components and units that is different from a number cited herein to bring about a mode of operation described herein.

BRIEF DESCRIPTION OF THE DRAWINGS

Further advantages will emerge from the description of the drawing which follows. The drawing shows exemplary embodiments of the invention. The drawing, description and claims contain numerous features in combination. The person skilled in the art will expediently also consider the features individually and combine them in further useful combinations.

DETAILED DESCRIPTION OF EXEMPLARY EMBODIMENTS OF THE PRESENT INVENTION

Figure 1:
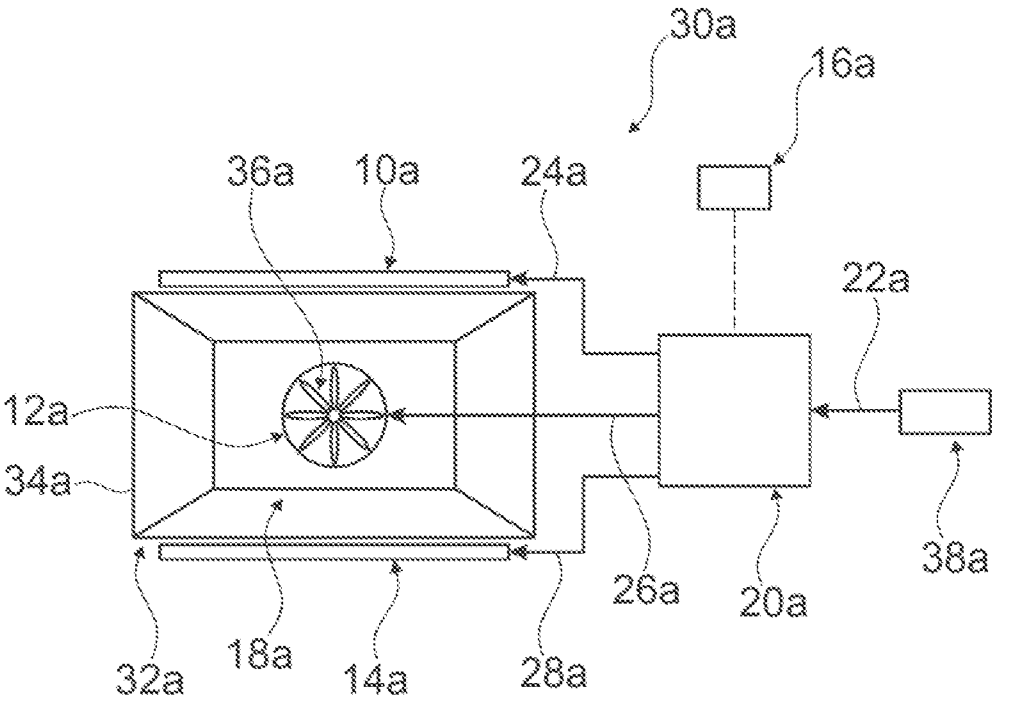
FIG. 1 shows a schematic view of a cooking appliance configured by way of example as an oven, with a cooking appliance apparatus.

FIG. 1 shows a schematic view of a cooking appliance 30*a* configured by way of example as an oven. The cooking appliance 30*a* is configured as an induction cooking appliance, in the present instance in particular as an induction oven. However a cooking appliance could alternatively also be configured as a conventional cooking appliance. A cooking appliance could also be configured as a microwave for example.

The cooking appliance 30*a* comprises a cooking appliance apparatus. The cooking appliance apparatus comprises an appliance housing 32*a*. The appliance housing 32*a* defines an, in particular continuous, cooking chamber 18*a*. To this end the appliance housing 32*a* comprises an outer housing and a muffle 34*a*, which is arranged within the outer housing and delimits the cooking chamber 18*a*. The cooking appliance apparatus also comprises an appliance closing element (not shown). In the present instance the appliance closing element is configured as an appliance flap. The appliance closing element is provided to close off the cooking chamber 18*a*. However an appliance closing element could alternatively also be configured as appliance doors.

The cooking appliance apparatus further comprises a number of heating elements 10*a*, 12*a*, 14*a*. In the present instance the cooking appliance apparatus comprises three heating elements 10*a*, 12*a*, 14*a* by way of example. The heating elements 10*a*, 12*a*, 14*a* are integrated in the appliance housing 32*a*. The heating elements 10*a*, 12*a*, 14*a* are configured separately from one another. The heating elements 10*a*, 12*a*, 14*a* are arranged at a distance from one another. The heating elements 10*a*, 12*a*, 14*a* are provided to heat the cooking chamber 18*a*, in particular individually and/or jointly.

A first heating element 10*a* of the heating elements 10*a*, 12*a*, 14*a* is configured as an induction heating element. The first heating element 10*a* is configured as a heating coil. The first heating element 10*a* is arranged outside the cooking chamber 18*a*. The first heating element 10*a* is arranged flat against a muffle wall of the appliance housing 32*a*. The first heating element 10*a* has a first maximum rated power.

A second heating element 12*a* of the heating elements 10*a*, 12*a*, 14*a* is configured as a resistance heating element. The first heating element 10*a* and the second heating element 12*a* are therefore of different types. The second heating element 12*a* is configured as a ring heating element. The second heating element 12*a* is arranged in a region of a fan unit 36*a* of the cooking appliance apparatus. The second heating element 12*a* has a second maximum rated power.

A third heating element 14*a* of the heating elements 10*a*, 12*a*, 14*a* is configured as an induction heating element. The third heating element 14*a* is configured as a heating coil. The third heating element 14*a* is at least essentially similar in structure to the first heating element 10*a*. The third heating element 14*a* is arranged outside the cooking chamber 18*a*. The third heating element 14*a* is arranged flat against a further muffle wall of the appliance housing 32*a*, which is arranged in particular opposite the muffle wall. The third heating element 14*a* has third maximum rated power. Alternatively a cooking appliance apparatus could also have a number of heating elements other than three, for example just two and/or at least four and/or at least five heating elements. A cooking appliance apparatus could also have heating elements of the same type, for example solely induction heating elements or resistance heating elements. At least one heating element could also be configured as a microwave element.

The cooking appliance apparatus also comprises a control unit 16*a*. The control unit 16*a* is integrated in the appliance housing 32*a*. The control unit 16*a* is provided to control and/or regulate operation of the cooking appliance 30*a* and/or the cooking appliance apparatus. In the present instance the control unit 16*a* is provided at least to activate the heating elements 10*a*, 12*a*, 14*a*. To this end the control unit 16*a* comprises a storage unit with an operating program stored therein and a computation unit, which is provided to execute the operating program.

The control unit 16*a* is provided to operate just one of the heating elements 10*a*, 12*a*, 14*a* to heat the cooking chamber 18*a* in at least one first operating state. The control unit 16*a* is provided to operate the heating elements 10*a*, 12*a*, 14*a* individually in the first operating state. The control unit 16*a* is provided to operate the first heating element 10*a*, the second heating element 12*a* or the third heating element 14*a* in the first operating state.

The control unit 16*a* is provided to operate at least two of the heating elements 10*a*, 12*a*, 14*a* jointly and in particular simultaneously to heat the cooking chamber 18*a* in at least one second operating state. In the present instance the control unit 16*a* is provided for example to operate the first heating element 10*a* and the second heating element 12*a* jointly and in particular at the same time in the second operating state. Alternatively or additionally the control unit 16*a* can however also be provided to operate the first heating element 10*a* and the third heating element 14*a* and/or the second heating element 12*a* and the third heating element 14*a* jointly and in particular simultaneously.

The control unit 16*a* is provided to operate all the heating elements 10*a*, 12*a*, 14*a* jointly and in particular simultaneously to heat the cooking chamber 18*a* in at least one third operating state. Alternatively a first operating state and/or a third operating could also be omitted.

The cooking appliance apparatus also comprises a power distributor unit 20*a*. The power distributor unit 20*a* is configured as a structural unit. The power distributor unit 20*a* has an operational connection to an energy source 38*a*. In the present instance the power distributor unit 20*a* is connected in particular directly to the energy source 38*a*, in the present instance in particular a power network and/or a household network. The energy source 38*a* is provided to supply a total power 22*a* with at least 3600 W.

The power distributor unit 20*a* also has an operational connection to each of the heating elements 10*a*, 12*a*, 14*a*. In the present instance the power distributor unit 20*a* is connected electrically to each of the heating elements 10*a*, 12*a*, 14*a*. The power distributor unit 20*a* is therefore arranged between the energy source 38*a* and the heating elements 10*a*, 12*a*, 14*a*.

The power distributor unit 20*a* also has an operational connection to the control unit 16*a*. The control unit 16*a* here is provided to activate the power distributor unit 20*a*.

The power distributor unit 20*a* is provided to distribute the total power 22*a* to the heating elements 10*a*, 12*a*, 14*a* and in the process to feed an output power 24*a*, 26*a*, 28*a* to at least one of the heating elements 10*a*, 12*a*, 14*a*. A total output power, in particular a sum of all the output powers 24*a*, 26*a*, 28*a*, of the power distributor unit 20*a* here is equal to the total power 22*a* in every operating state, thereby ensuring a high level of efficiency. The following applies:

$$P_T=\Sigma_i P_i$$

$P_T$ here corresponds to the total power 22*a*, while $P_i$ describes one of the output powers 24*a*, 26*a*, 28*a*.

In the present instance the power distributor unit 20*a* is provided to distribute the total power 22*a* in a variable manner to the heating elements 10*a*, 12*a*, 14*a*. The power distributor unit 20*a* is provided to set a value of at least one of the output powers 24*a*, 26*a*, 28*a* in a variable manner, in particular in a power interval between 0% of the total power 22*a* and 100% of the total power 22*a*.

In the first operating state the power distributor unit 20*a* is provided to convert the total power 22*a* to just one output power 24*a*, 26*a*, 28*a* and supply it to one heating element 10*a*, 12*a*, 14*a* of the heating elements 10*a*, 12*a*, 14*a* operated in the first operating state. The just one output power 24*a*, 26*a*, 28*a* here is equal to the total power 22*a*. The just one output power 24*a*, 26*a*, 28*a* advantageously also corresponds in this instance to a maximum rated power of the heating element 10*a*, 12*a*, 14*a* operated in the first operating state. The following applies:

$$P_T=P_i \qquad \text{b.}$$

In the second operating state the power distributor unit 20*a* is provided to divide the total power 22*a* into two output powers 24*a*, 26*a*, 28*a* and supply them to two heating elements 10*a*, 12*a*, 14*a* of the heating elements 10*a*, 12*a*, 14*a* operated in the second operating state. A sum of the output powers 24*a*, 26*a*, 28*a* here is equal to the total power 22*a*. The output powers 24*a*, 26*a*, 28*a* in this instance are also lower than a maximum rated power of the heating elements 10*a*, 12*a*, 14*a* operated in the second operating state. In this instance the power distributor unit 20*a* is also provided to set a value of one of the output powers 24*a*, 26*a*, 28*a* in a variable manner, in particular in a power interval between 0% of the total power 22*a* and 100% of the total power 22*a*, while the other value results automatically from the total power 22*a*. In the present instance the power distributor unit 20*a* is provided by way of example to divide the total power 22*a* into a first output power 24*a* and a second output power 26*a* in the second operating state and to supply the first output power 24*a* to the first heating element 10*a* and the second output power 26*a* to the second heating element 12*a*. The following applies:

$$P_T=P_1+P_2 \qquad \text{c.}$$

In the third operating state the power distributor unit 20*a* is provided to divide the total power 22*a* into three output powers 24*a*, 26*a*, 28*a* and to supply them to all the heating elements 10*a*, 12*a*, 14*a* operated in the third operating state. A sum of the output powers 24*a*, 26*a*, 28*a* here is equal to the total power 22*a*. Also in this instance the output powers 24*a*, 26*a*, 28*a* are lower than a maximum rated power of the heating elements 10*a*, 12*a*, 14*a* operated in the third operating state. In this instance the power distributor unit 20*a* is also provided to set a value of two output powers 24*a*, 26*a*, 28*a* in a variable manner, in particular in a power interval between 0% of the total power 22*a* and 100% of the total power 22*a*, while the last value results automatically from the total power 22*a*. In the present instance the power distributor unit 20*a* is provided to divide the total power 22*a* into a first output power 24*a*, a second output power 26*a* and a third output power 28*a* in the third operating state and to supply the first output power 24*a* to the first heating element 10*a*, the second output power 26*a* to the second heating element 12*a* and the third output power 28*a* to the third heating element 14*a*. The following applies:

$$P_T=P_1+P_2+P_3 \qquad \text{d.}$$

Purely by way of example it would be possible for $P_1=0.2\cdot P_T$, $P_2=0.1\cdot P_T$ and $P_3=0.7\cdot P_T$ to apply here. However any other values could also be selected for $P_1$, $P_2$ and $P_3$. This allows an advantageously flexible appliance apparatus to be achieved with a plurality of different operating modes, which allow for example advantageously fast preheating, advantageously fast cooking and/or advantageously fast cleaning.

Figure 2:
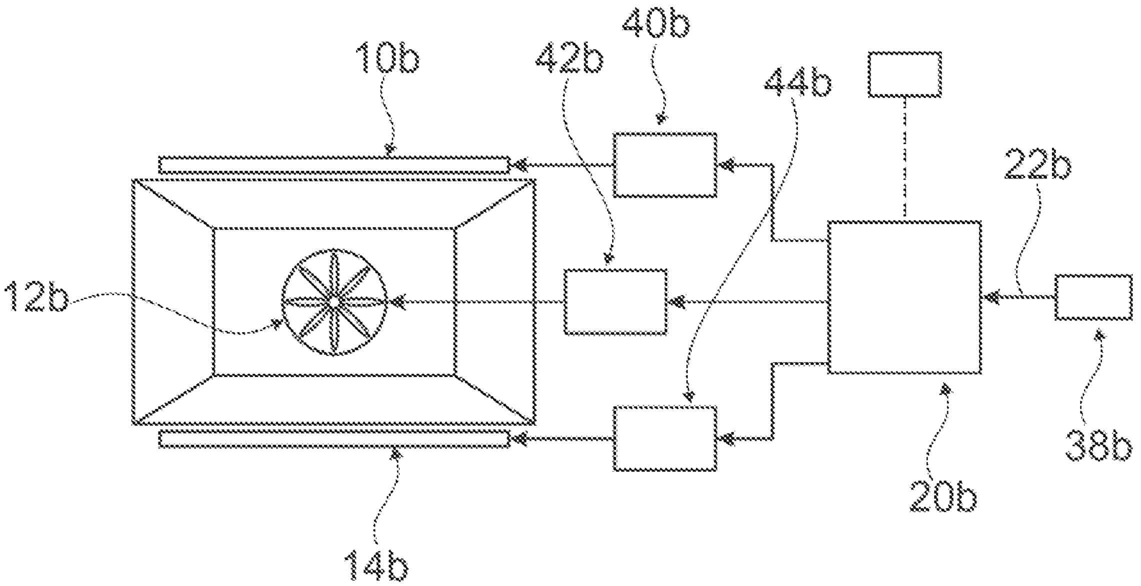
FIG. 2 shows a schematic view of a further exemplary embodiment of a cooking appliance with a cooking appliance apparatus.
Figure 3:
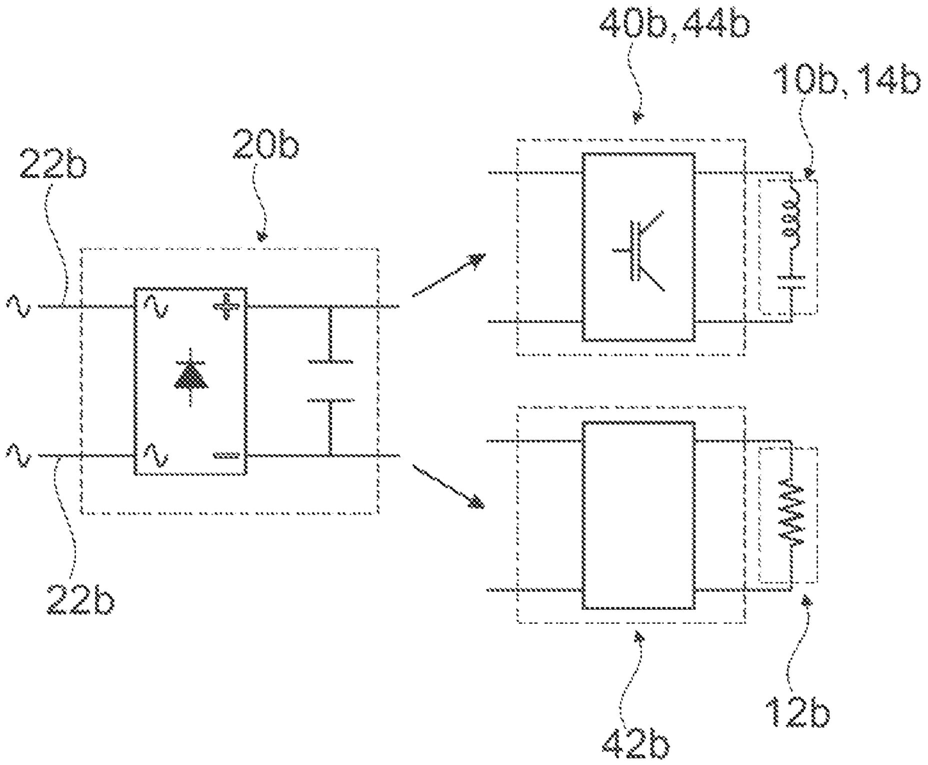
FIG. 3 shows a detailed view of part of the cooking appliance apparatus from FIG. 2.

FIGS. 2 and 3 show a further exemplary embodiment of the invention. The descriptions which follow and the drawings are essentially limited to the differences between the exemplary embodiments, it being possible in principle also to refer to the drawings and/or the description of the other exemplary embodiment, in particular in FIG. 1, for components of identical designation, in particular components with identical reference characters. To distinguish between the exemplary embodiments, the letter a follows the reference characters of the exemplary embodiment in FIG. 1. In the exemplary embodiment in FIGS. 2 and 3 the letter a is replaced by the letter b.

In this instance the cooking appliance apparatus comprises a number of converter units 40*b*, 42*b*, 44*b*. The number of converter units 40*b*, 42*b*, 44*b* here is tailored to a number of different heating elements 10*b*, 12*b*, 14*b* and/or a number of heating elements 10*b*, 12*b*, 14*b*. The converter units 40*b*, 42*b*, 44*b* are connected downstream of a power distributor unit 20*b*. The converter units 40*b*, 42*b*, 44*b* are configured separately from the power distributor unit 20*b*. The converter units 40*b*, 42*b*, 44*b* are arranged between the power distributor unit 20*b* and the heating elements 10*b*, 12*b*, 14*b*. At least two of the converter units 40*b*, 42*b*, 44*b* are configured differently. The converter units 40*b*, 42*b*, 44*b* are each provided to tailor an output power of the power distributor unit 20*b* to a type of the heating elements 10*b*, 12*b*, 14*b* and supply it to a respective heating elements 10*b*, 12*b*, 14*b*. Alternatively however it is also conceivable for the converter units to be integrated in a power distributor unit. The power distributor unit can in particular comprise the converter units in this instance.

FIG. 3 shows a detailed view of the power distributor unit 20*b* and the converter units 40*b*, 42*b*, 44*b*. In the present instance the power distributor unit 20*b* is provided to convert a total power 22*b* supplied by an energy source 38*b*, in particular in the form of an alternating voltage, to a direct current voltage and supply it to the converter units 40*b*, 42*b*, 44*b*.

A first converter unit 40*b* of the converter units 40*b*, 42*b*, 44*b* is assigned to a first heating element 10*b* of the heating elements 10*b*, 12*b*, 14*b*. The first converter unit 40*b* here comprises at least one inverter, so a heating power of the first heating element 10*b* is in particular a function of a switching frequency of the inverter.

A second converter unit 42*b* of the converter units 40*b*, 42*b*, 44*b* is assigned to a second heating element 12*b* of the heating elements 10*b*, 12*b*, 14*b*. The second converter unit 42*b* here comprises at least one DC/DC converter, advantageously a quasi-resonant voltage converter, so a heating power of the second heating element 12*b* is in particular a function of an amplitude of an output voltage of the DC/DC converter.

A third converter unit 44*b* of the converter units 40*b*, 42*b*, 44*b* is assigned to a third heating element 14*b* of the heating elements 10*b*, 12*b*, 14*b*. The third converter unit 44*b* here comprises at least one further inverter, so a heating power of the third heating element 14*b* is in particular a function of a switching frequency of the further inverter. Alternatively however it is also conceivable to omit a third converter unit. It is then conceivable for a first converter unit to be assigned to a first heating element and a third heating element.

The invention claimed is:

1. A cooking appliance apparatus, in particular an oven apparatus, comprising:

a first heating element;

a second heating element;

a control unit configured to jointly operate the first and second heating elements to heat a cooking chamber in an operating state; and a power distributor unit configured to divide a total power into a first output power and a second output power in the operating state and to supply the first output power to the first heating element and the second output power to the second heating element, wherein the power distributor unit has an operational connection to an energy source configured to supply the total power to the cooking appliance apparatus, and wherein the control unit is configured to control operation of the power distributor unit such that a total output power of the power distributor unit is at least essentially equal to the total power in every operating state.

2. The cooking appliance apparatus of claim 1, wherein the first output power is lower than a maximum rated power of the first heating element.

3. The cooking appliance apparatus of claim 1, wherein the total power is at least 3600 W.

4. The cooking appliance apparatus of claim 1, wherein the second output power is lower than a maximum rated power of the second heating element.

5. The cooking appliance apparatus of claim 1, wherein the power distributor unit is configured to set a value of at least one of the first and second output powers in a variable manner.

6. The cooking appliance apparatus of claim 1, wherein the power distributor unit is configured as a structural unit.

7. The cooking appliance apparatus of claim 1, wherein the first and second heating elements are of a different heating element type.

8. The cooking appliance apparatus of claim 1, wherein at least one of the first and second heating elements is configured as an induction heating element.

9. The cooking appliance apparatus of claim 1, wherein at least one of the first and second heating elements is configured as a resistance heating element.

10. The cooking appliance apparatus of claim 1, wherein in a further operating state the power distributor unit is configured to convert the total power to an output power and to supply the output power to one of the first and second heating elements.

11. A cooking appliance, comprising a cooking appliance apparatus, said cooking apparatus comprising a first heating element, a second heating element, a control unit configured to jointly operate the first and second heating elements to heat a cooking chamber in an operating state, and a power distributor unit configured to divide a total power into a first output power and a second output power in the operating state and to supply the first output power to the first heating element and the second output power to the second heating element, wherein the power distributor unit has an operational connection to an energy source configured to supply the total power to the cooking appliance apparatus, and wherein the control unit is configured to control operation of the power distributor unit such that a total output power of the power distributor unit is at least essentially equal to the total power in every operating state.

12. The cooking appliance of claim 11, wherein the total power is at least 3600 W.

13. The cooking appliance of claim 11, wherein the first output power is lower than a maximum rated power of the first heating element.

14. The cooking appliance of claim 11, wherein the second output power is lower than a maximum rated power of the second heating element.

15. The cooking appliance of claim 11, wherein the power distributor unit is configured to set a value of at least one of the first and second output powers in a variable manner.

16. The cooking appliance of claim 11, wherein the power distributor unit is configured as a structural unit.

17. The cooking appliance of claim 11, wherein the first and second heating elements are of a different heating element type.

18. The cooking appliance of claim 11, wherein at least one of the first and second heating elements is configured as an induction heating element.

19. The cooking appliance of claim 11, wherein at least one of the first and second heating elements is configured as a resistance heating element.

20. The cooking appliance of claim 11, wherein in a further operating state the power distributor unit is configured to convert the total power to an output power and to supply the output power to one of the first and second heating elements.

21. The cooking appliance apparatus of claim 1, further comprising:

a first converter unit between the power distributor unit and the first heating element; and a second converter unit between the power distributor unit and the second heating element, wherein the control unit is configured to control the first converter unit and the second converter unit to adjust at least one of the first output power and the second output power based on a type of heating element of at least one of the first and second heating elements and to supply an adjusted output power to the at least one of the first and second heating elements, and wherein the first heating element is a different heating element type from the second heating element.

22. The cooking appliance apparatus of claim 1, further comprising:

a third heating element;

a first converter unit between the power distributor unit and the first heating element;

a second converter unit between the power distributor unit and the second heating element; and a third converter unit between the power distributor unit and the third heating element;

wherein the control unit is configured to jointly operate the first heating element, the second heating element, and the third heating element to heat the cooking chamber in the operating state, wherein the power distributor unit is configured to divide the total power into the first output power, the second output power, and a third power output, and to supply the first output power to the first heating element, the second output power to the second heating element, and the third output power to the third heating element, wherein the control unit is configured to control the first converter unit, the second converter unit, and the third converter unit to adjust at least one of the first output power, the second output power, and the third output power based on a type of heating element of at least one of the first, second, and third heating elements and to supply an adjusted output power to the at least one of the first, second, and third heating elements, and wherein one of the first, second, and third heating elements is a different heating element type from another of the first, second, and third heating elements.

23. A method for operating a cooking appliance apparatus, comprising:

dividing in an operating state, by a power distributor unit, a total power of an energy source into a first output power and a second output power;

controlling an operation of the power distributor unit such that a total output power of the power distributor unit is at least essentially equal to the total power in every operating state; and supplying the first output power to a first heating element of the cooking appliance apparatus and the second output power to a second heating element of the cooking appliance apparatus for heating a cooking chamber in the operating state.

* * * * *